(12) United States Patent
Duncan et al.

(10) Patent No.: US 10,301,789 B2
(45) Date of Patent: May 28, 2019

(54) BIOMASS STORAGE SYSTEM

(71) Applicant: Elwha LLC, Bellevue, WA (US)

(72) Inventors: William D. Duncan, Sammamish, WA (US); Roderick A. Hyde, Redmond, WA (US); Jordin T. Kare, San Jose, CA (US); Tony S. Pan, Bellevue, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 15/606,593

(22) Filed: May 26, 2017

(65) Prior Publication Data

US 2017/0260710 A1    Sep. 14, 2017

Related U.S. Application Data

(63) Continuation of application No. 14/671,490, filed on Mar. 27, 2015, now Pat. No. 9,663,913, which is a
(Continued)

(51) Int. Cl.
*A01B 49/04* (2006.01)
*E02B 11/02* (2006.01)
(Continued)

(52) U.S. Cl.
CPC .............. *E02B 11/02* (2013.01); *A01B 49/04* (2013.01); *A01D 43/14* (2013.01); *A01G 25/00* (2013.01);
(Continued)

(58) Field of Classification Search
CPC ........ A01D 2/356; A01D 87/10; A01D 43/14; B65G 31/04; B65G 33/10; C05F 17/02; C05F 17/0241; E02F 9/245; E02B 11/02; A01B 49/04; A01C 1/042; A01G 25/00; A01G 9/02; A01G 31/001; A01G 13/0268; A01G 13/0262; B01J 8/082; B01J 8/085; B01J 8/087
(Continued)

(56) References Cited

U.S. PATENT DOCUMENTS 4,177,626 A   12/1979  McNaught
4,180,348 A   12/1979  Taylor
(Continued)

FOREIGN PATENT DOCUMENTS

KR    101189588    10/2012

OTHER PUBLICATIONS

PCT International Search Report; International App. No. PCT/US2013/070587; dated May 7, 2014; pp. 1-5.

*Primary Examiner* — Robert E Pezzuto
(74) *Attorney, Agent, or Firm* — Foley & Lardner LLP

(57) ABSTRACT

An apparatus for forming a water storage material from a biomass input material using supercritical or subcritical fluid processing, the water storage material capable of absorbing a liquid and releasing the liquid. The apparatus utilizes supercritical fluid processing, subcritical fluid processing, charring, or a combination thereof. The apparatus includes a controller configured to control the apparatus. The apparatus further including a processing station configured to hold the biomass input material, and to use the biomass input material for processing into the water storage material.

11 Claims, 7 Drawing Sheets

Related U.S. Application Data continuation of application No. 13/682,417, filed on Nov. 20, 2012, now Pat. No. 8,991,513.

(51) Int. Cl.
    *A01G 25/00*     (2006.01)
    *A01D 43/14*     (2006.01)
    *B01J 8/08*     (2006.01)

(52) U.S. Cl.
    CPC .............. *B01J 8/082* (2013.01); *B01J 8/085* (2013.01); *B01J 8/087* (2013.01); *B01J 2208/00008* (2013.01)

(58) Field of Classification Search
    USPC ......... 37/239; 172/2–11; 198/300, 513, 519, 198/642, 671; 414/526, 694; 701/50
    See application file for complete search history.

(56) References Cited

U.S. PATENT DOCUMENTS

| | | |
|---|---|---|
| 4,787,928 A | 11/1988 | Balassa |
| 4,968,211 A | 11/1990 | Compton |
| 5,059,064 A | 10/1991 | Justice |
| 5,534,042 A | 7/1996 | Tsuchida |
| 6,029,395 A | 2/2000 | Morgan |
| 6,120,210 A | 9/2000 | Hsu |
| 8,444,925 B2 | 5/2013 | Baba |
| 8,465,567 B2 | 6/2013 | Bottcher et al. |
| 8,505,711 B2 | 8/2013 | Geraets et al. |
| 8,694,258 B2 * | 4/2014 | Haddad ................. G01S 13/885 702/7 |
| 9,222,880 B2 * | 12/2015 | Smith ..................... G01N 21/27 |
| 9,581,691 B2 * | 2/2017 | Simicevic ................ H01Q 9/28 |
| 2007/0260378 A1 * | 11/2007 | Clodfelter ............... F41H 11/12 701/48 |
| 2008/0095599 A1 | 4/2008 | Hahn |
| 2009/0098251 A1 | 4/2009 | Rajagopalan et al. |
| 2010/0199734 A1 | 8/2010 | Bottcher et al. |
| 2010/0202864 A1 | 8/2010 | Geraets et al. |
| 2011/0239685 A1 | 10/2011 | Baba |
| 2014/0180549 A1 * | 6/2014 | Siemens ................ A01B 39/18 701/50 |

\* cited by examiner

BIOMASS STORAGE SYSTEM

CROSS-REFERENCE TO RELATED PATENT APPLICATIONS

This application is a Continuation of U.S. patent application Ser. No. 14/671,490, filed Mar. 27, 2015 (now U.S. Pat. No. 9,663,913), which is a Continuation of U.S. patent application Ser. No. 13/682,417, filed Nov. 20, 2012 (now U.S. Pat. No. 8,991,513). The entire disclosures of the foregoing applications are hereby incorporated by reference herein and for all purposes.

BACKGROUND

Agricultural growing operations require large amounts of water to grow and harvest crops. This water comes from natural rainfall and from irrigation. The water provided from rainfall and irrigation generally soaks into the soil where crops are grown. However, after being soaked into the soil, the water continues to seep down and away from the surface. After time, the water seeps to a level deep enough such that the roots of plants cannot gain access to the water. Once water seeps below a useful level, farmers are left with little choice but to re-water the land or wait for more rain. Throughout the course of a farming season, the repetitive re-watering contributes to substantial water waste.

Soil additives can be used in effort to alleviate the water seepage problem. These additives are typically made of plastics or plastic-type materials. However, these soil additives are subject to challenges with respect to use on a large scale in mass agricultural growing operations. The presently available plastic soil additives are expensive to purchase, expensive to transport, and time-consuming to place.

SUMMARY

One exemplary embodiment relates to an apparatus for forming a water storage material from a biomass input material using supercritical or subcritical fluid processing. The water storage material is capable of absorbing a liquid and releasing the liquid. The apparatus includes a controller configured to control the apparatus. The apparatus further includes a processing station configured to hold and to use the biomass input material for processing into the water storage material. The apparatus includes a storage unit configured to hold a fluid. The apparatus further includes a liquid outlet having a fluid input connected to an output of the storage unit. The liquid outlet is positioned to supply the fluid into the processing station for processing the biomass input material into the water storage material. The apparatus includes a pump and a basin. The basin is configured to receive the fluid supplied by the liquid outlet. The basin positioned such that the fluid supplied by the liquid outlet passes through the processing station before being received in the basin. The basin is operatively connected to an input of the storage unit such that fluid captured in the basin is returned to the storage unit.

Another exemplary embodiment relates to an apparatus for harvesting a plant and processing a portion of the plant into a water storage material capable of absorbing a liquid and releasing the liquid. The apparatus includes a harvester configured to harvest a plant that has a first portion and a second portion. The apparatus further includes a separating mechanism configured to separate the first portion of the plant from the second portion of the plant. The apparatus includes a processing component that has an input and an output. The processing component is operatively connected to the separating mechanism at the input such that the processing component receives the second portion of the plant. The processing component is configured to process the second portion of the plant into the water storage material. The apparatus further includes a burying mechanism operatively connected to the output of the processing component such that the burying mechanism receives the water storage material. The burying mechanism is configured to bury the water storage material at a burying depth below a surface of a ground material.

Still another exemplary embodiment relates to a method of placing a water storage material in a ground material. The water storage material is capable of absorbing a liquid and releasing the liquid. The method includes determining a burial depth for the water storage material. The desired burial depth is conditional upon at least one agricultural parameter. The method further includes removing a portion of the ground material to form a first trench in the ground material. The first trench has a burying depth. The method includes placing a selected amount of the water storage material into the first trench at the burying depth. The selected amount is conditional upon at least one of the agricultural parameter. The method further includes covering the water storage material by repositioning at least a portion of the ground material removed into the first trench.

Yet another exemplary embodiment relates to a method of placing a water storage material capable of absorbing and releasing a liquid in a ground material responsive to an emplacement plan. The method includes receiving a user input that defines the designated emplacement map. The method further includes converting the user input into a machine path and a set of parameters, wherein the machine path corresponds to the emplacement plan. The method includes tracking a machine by locating a position of the machine. The method further includes comparing the position of the machine to the machine path and instructing placement of the water storage material by the machine. The method includes generating a placement data set and storing the placement data set.

Another exemplary embodiment relates to an apparatus for detecting a condition of a ground material and placing a water storage material in the ground material. The water storage material is capable of absorbing a liquid and releasing the liquid. The apparatus includes a vehicle including a sensor and a burying mechanism. The sensor is configured to detect a condition of the ground material and to provide a sensor signal. The burying mechanism is configured to bury the water storage material at a burying depth below a surface of the ground material.

Another exemplary embodiment relates to an apparatus for collecting a plant waste and processing the plant waste into a water storage material capable of absorbing a liquid and releasing the liquid. The apparatus includes a waste pickup mechanism configured to receive the plant waste. The apparatus further includes a processing component having an input and an output. The processing component is coupled to the waste pickup mechanism at the input such that the processing component receives the plant waste. The processing component is configured to process the plant waste into the water storage material. The apparatus includes a burying mechanism coupled to the output of the processing component such that the burying mechanism receives the water storage material. The burying mechanism is configured to bury the water storage material at a burying depth below a surface of a ground material.

Still another exemplary embodiment relates to a method of collecting plant waste and processing the plant waste into a water storage material capable of absorbing a liquid and releasing the liquid. The method includes receiving the plant waste at a plant waste pickup mechanism. The method further includes providing the plant waste to an input of a processing component. The method includes processing the plate waste into the water storage material. The method further includes providing the water storage material to a burying mechanism and burying the water storage material at a burying depth below a surface of a ground material.

Yet another exemplary embodiment relates to a method of placing water storage material capable of absorbing a liquid and releasing the liquid in a ground material. The method includes providing a sensor and detecting a condition of the ground material. The method further includes providing a first water storage material to a burying mechanism and burying the first water storage material at a burying depth below a surface of a ground material.

An additional exemplary embodiment relates to a method of harvesting a plant and processing a portion of the plant into a water storage material capable of absorbing a liquid and releasing the liquid. The method includes harvesting a plant, the plant having a first portion and a second portion. The method further includes separating the first portion from the second portion. The method includes storing the first portion and providing the second portion to a processing component. The method further includes processing the second portion into the water storage material. The method includes providing the water storage material to a burying mechanism and burying the water storage material at a burying depth below a surface of a ground material.

Another exemplary embodiment relates to a system for harvesting a plant, processing a portion of the plant into a water storage material capable of absorbing a liquid and releasing the liquid, and burying the water storage material in a ground material. The system includes a harvester configured to harvest a plant that has a first portion and a second portion. The harvester includes a separating mechanism configured to separate the first portion of the plant from the second portion of the plant. The harvester further includes a processing component having an input and an output. The processing component is operatively connected to the separating mechanism at the input such that the processing component receives the second portion of the plant. The processing component is configured to process the second portion of the plant into the water storage material capable of absorbing the liquid and releasing the liquid in a time controlled manner. The harvester further includes a deposition mechanism configured to deposit the water storage material onto the ground material.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Generally, agricultural growing operations utilize large quantities of water. Much of the water goes to waste because it seeps or percolates to a depth below the reach of the crops' roots. Additionally, farming operations generate large amounts of plant waste during the harvesting process. Many crops generate a very small amount of desirable and marketable product and a large amount of waste plant material. Using corn as an example, the ears are the valuable portion of the crop, yet represent a small portion of the overall plant, while the stalks and leaves are generally viewed as waste and represent a large portion of the plant.

The contemplated water storage material is intended to provide a cost effective method of maintaining water in soil for large scale operations. In one embodiment, a water storage material is made out of plant waste that typically accumulates on a farm during harvesting. The water storage material can be made on-site to avoid transportation costs. The plant waste is transformed into a low-density open-celled cellulosic foam that can absorb liquids, including water, as well as various items dissolved into the liquid, such as nutrients, minerals, fertilizers, and pesticides. Alternatively, the plant waste can be transformed into a fibrous material that can absorb liquids, including water, as well as various items dissolved into the liquid, such as nutrients, minerals, fertilizers, and pesticides. The contemplated water storage material additionally operates to release absorbed liquids and chemicals in a slow and controlled fashion.

Figure 1:
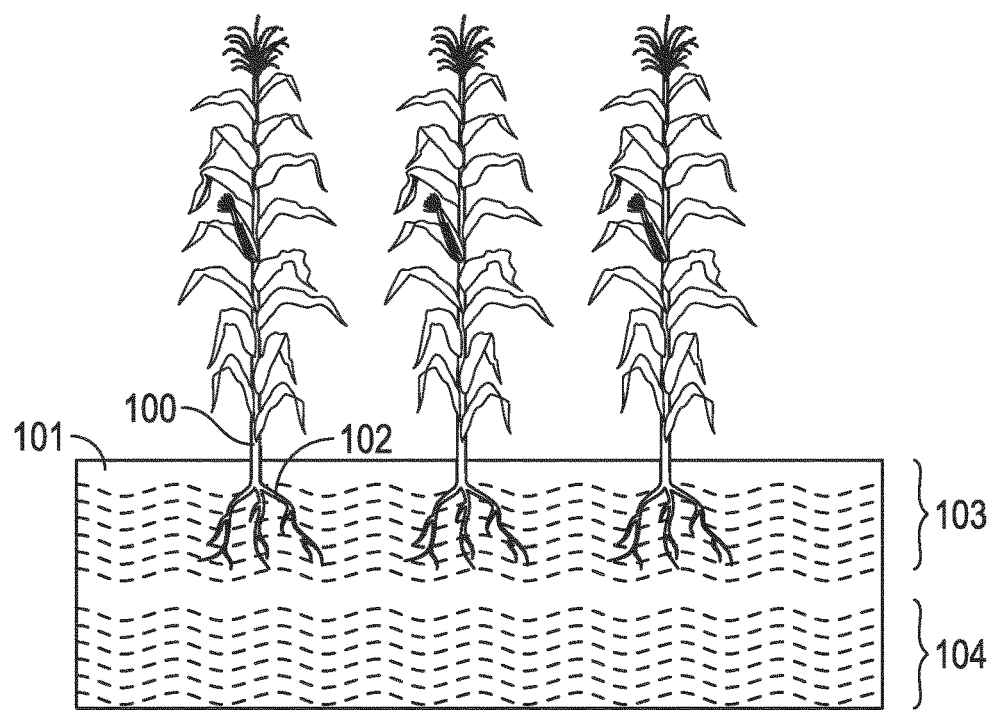
FIG. 1 is a schematic view of farmland containing a crop.

Referring to FIG. 1, a cross-section of an exemplary farmland is shown. The exemplary farmland is used to grow and harvest corn 100. Corn 100 is planted in soil 101. Corn 100 absorbs water and other nutrients through its roots 102. The soil contains water. The water is generally absorbed in the soil after a rainfall or through irrigation. As the water is absorbed through the soil, it continues to fall deeper and deeper below the surface. This creates both reachable water 103 that is able to be absorbed by corn 100 through roots 102, as well as unreachable water 104 that is deeper than the reach of roots 102.

Figure 2:
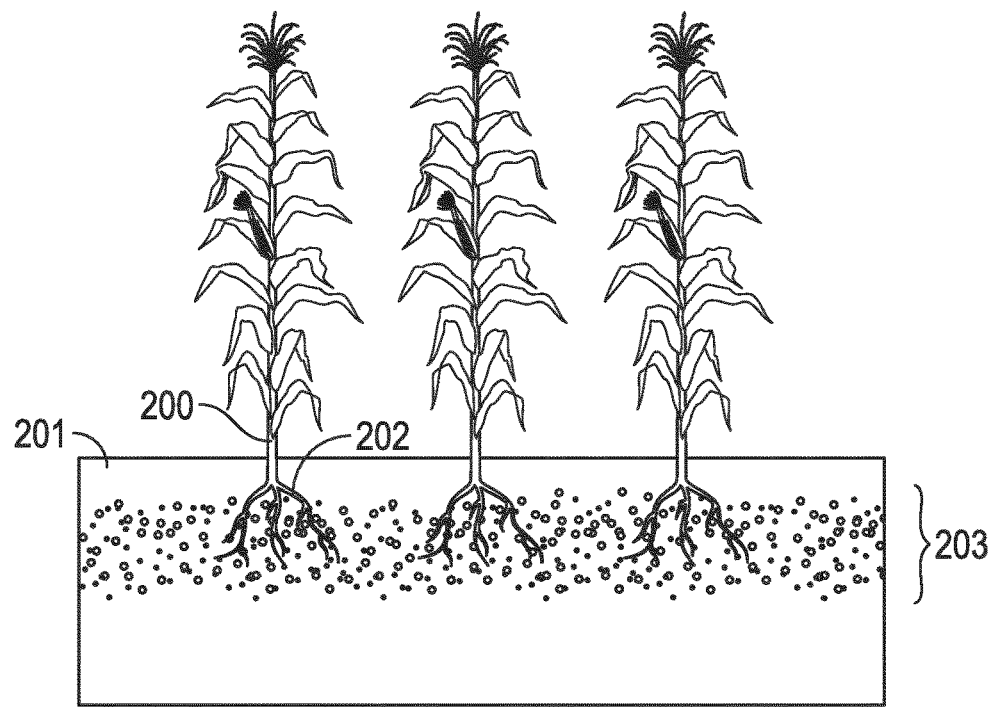
FIG. 2 is a schematic view of farmland having a water storage material layer in the soil.

Referring to FIG. 2, a cross-section of farmland containing water storage system 203 in the soil 201 is shown according to an exemplary embodiment. Water storage system 203 is operable to absorb and retain water that percolates from the surface of soil 201 down through the depths of the soil. Water storage system 203 is generally placed at a depth corresponding to the depth of roots 202 of corn 200. Water storage system 203 is placed such that it absorbs and retains water that would normally percolate through the soil beyond the reach of roots 202 such that corn 200 can consume the water. Water storage system 203 helps to minimize water loss and reduce the amount of watering needed in an agriculture or plant growing operation.

In one embodiment, water storage system 203 is a low-density open-celled cellulosic foam. In another embodiment, water storage system 203 is a fibrous material. Water storage system 203 is formed from biomass. In one embodiment, the biomass is plant material. In another embodiment, the biomass is plant waste remaining after a farm harvesting operation. Water storage system 203 can be formed in different manners to achieve various water absorption properties and to achieve required rates of water release. Water storage system 203 may or may not be biodegradable.

Water storage system 203 may have additional beneficial functions other than water absorption and controlled water release. It is contemplated that water storage system 203 contains nutrients, minerals, pesticides, and/or biological nutrients such as nitrogen fixing bacteria. In addition, seeds may be added to the water storage system 203 to germinate as crops and/or weed suppressing plants with roots well established in the water storage system. Water storage system 203 functions by enabling a slower, controlled release of any nutrients, minerals, and/or pesticides contained within the water storage system 203 than untreated soil could afford. Water storage system 203 may be impregnated with nutrients, minerals, and/or pesticides during the water storage system manufacturing process. The impregnated chemical may be a hydrophobic or hydrophilic substance. Alternatively, water storage system 203 can absorb nutrients, minerals, biological materials, and/or pesticides and/or seeds during the emplacement process or after water storage system 203 is placed in the ground.

Figure 3:
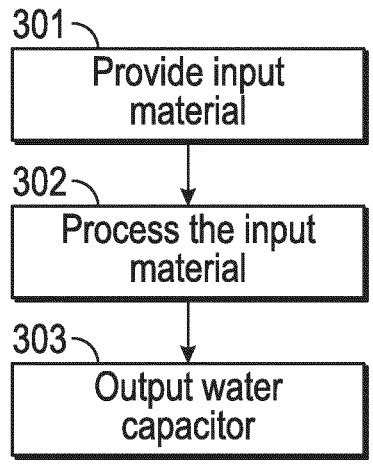
FIG. 3 is a flow diagram of the general process of making water storage material.

Referring to FIG. 3, an exemplary method for transforming input material 301 into a water storage material is shown. Input material 301 is comprised of biomass. Input material 301 is biomass, such as plant material and/or plant waste material. Input material 301 is processed (step 302). Processing step 302 works to break the bonds of input material 301 and transform the input material into a material (step 303) capable of acting as water storage material. The resultant material is output (step 303) as a fibrous material, a foam, or another material capable of performing as a water storage material.

Figure 4:
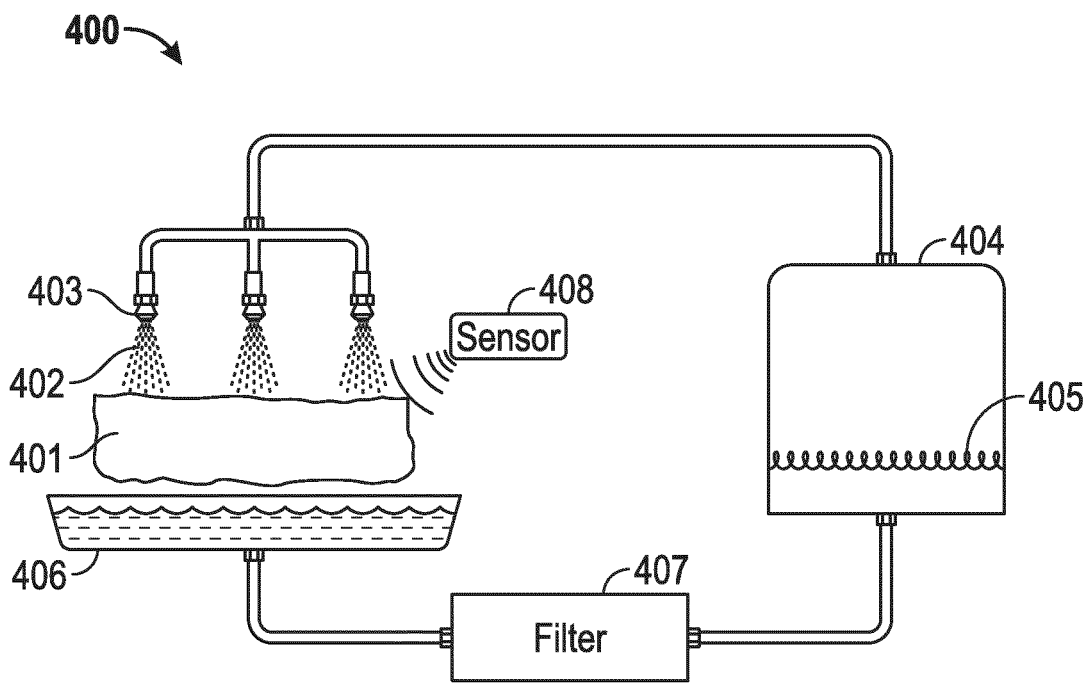
FIG. 4 is a schematic view of an embodiment of a water storage processing machine.

Referring to FIG. 4, an exemplary water storage material processing system 400 is shown. Processing system 400 utilizes supercritical fluid or close to supercritical (subcritical) fluid processing to transform input material 401 into water storage material. During supercritical or subcritical fluid processing, input material 401 is subjected to a stream of reactant fluid 402. Stream of fluid 402 is directed towards input material 401 by liquid outlets 403. Liquid outlets 403 may be tapered or untapered nozzles. The fluid may be heated and/or of a high temperature. The heated fluid may be heated water. The heated fluid may be acidic and of a relatively extreme pH. According to various embodiments, the pH falls into a range of 0 and 5. The heated fluid 402 is stored in a reactant storage compartment, shown as but not limited to tank 404, such that stream of fluid 402 is a high-pressure stream. A pump may provide the pressure and transport fluid to liquid outlets 403. Alternatively, air pressure inside tank 404 may generate the fluid pressure and transport the fluid 402. The tank 404 may have a heater 405. Heater 405 can be located inside of tank 404 or outside of tank 404. The heat may come from electricity or from burning fuel. The heat can come from combusting a portion of input material 401. During exposure to heated fluid 402, input material is transformed into a water storage material. The water storage material can be a foam. Alternatively, the water storage material can be a fibrous material. The finished water storage material may be removed manually or automatically (e.g., through the use of a conveyor system). Additionally, post treatment processing fluid is captured in a byproduct storage device, shown as but not limited to basin 406, such that waste or byproduct fluid 402 can be passed through a recycling component, such as filter 407. The recycling component (filter 407) works to process the byproduct or waste fluid 402 resulting from the processing of the input material back into more reactant fluid 402. Accordingly, fluid 402 is returned to tank 404 for reuse in order to reduce waste fluid. It is contemplated that all of the components involved in the transport of the fluid can be operatively connected with hoses, pipes, or other suitable transport structures.

Processing system 400 further employs sensors 408 that monitor input material 401. Sensors 408 are operable to detect a characteristic of the input material. The characteristic may be the level of porosity of the processed input material in order to prevent over or under processing. The sensor may be an ultrasound sensor, an infrared sensor, a camera, or any other type of sensor operable to detect a characteristic of the input material. The pH, pressure, and temperature of the fluid, and processing time can be controlled to help prevent over or under processing. These variables may be controlled manually or by a controller. The controller may receive input from sensors 408, as well as input from additional sensors to monitor the pressure, pH, and temperature of the fluid.

The controller is operable to control all aspects of processing system 400. Generally, the controller includes a processing circuit and memory. The controller is operable to receive input signals from sensors 408, the operator of processing system 400, and any additional sensor or feedback signals necessary to control processing system 400. The controller is also operable to provide output to various components within processing system. Further, the controller may interface with a network such that the controller can communicate with devices outside of processing system 400.

It is noted that after use of processing system 400 is complete, there remains a tank full of hot, pressurized fluid. It is contemplated that the heat energy from the left-over hot fluid can be captured and stored for further use. Likewise, it is contemplated that the pressure from within the tank can be captured and stored.

Figure 5:
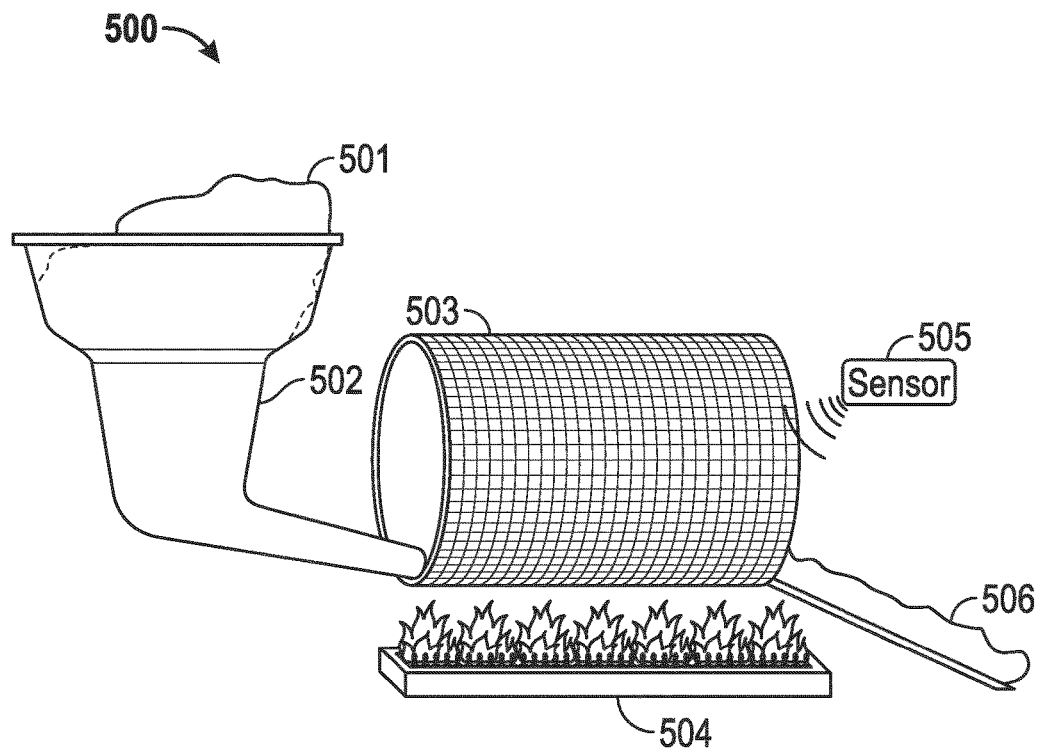
FIG. 5 is a schematic view of an alternative embodiment of a water storage processing machine.

Referring to FIG. 5, another exemplary processing system 500 is disclosed. Processing system 500 utilizes a charring technique to transform input material 501 into output material 506 capable of being used as a water storage material. Charring may or may not be done in an reduced oxygen atmosphere. Oxygen levels may be reducing by displacement with other gases such as nitrogen or using the evolved gases from the charring process or partially or fully sealing rotating drum 503. Input material 501 is fed into feeding device 502. Feeding device 502 feeds input material 501 into a processing station, shown as, but not limited to, rotating drum 503. Rotating drum 503 may be constructed out of a fire resistant mesh. The fire resistant mesh may be a heat resistant metal having a high melting temperature. Alternatively, the processing station can include a conveyor. Similarly, the conveyor may be constructed out of a heat resistant metal or metal mesh having a high melting temperature. Input material 501 is then passed over flames generated by burner unit 504 where the input material is charred to a sufficient level. The flames are generated through burning fuel. It is contemplated that the fuel can be a gas, a liquid, or a portion of the input material. Rotating drum 503 rotates during the charring process to ensure that input material 501 is evenly charred. Once the charring is sufficiently complete, the transformed material is output as output material 506. Output material 506 is capable of being used as a water storage material.

Processing system 500 employs sensors 505 that monitor the level of charring. Sensors 505 are operable to detect a characteristic of input material 501. The characteristic may be the level of porosity of the processed input material in order to prevent over or under processing. The sensor may be an ultrasound sensor, an infrared sensor, a camera, or any other type of sensor operable to detect a characteristic of input material 501. The temperature of the flames generated by burner unit 504, the rotational speed of rotating drum 503, and the processing time can be controlled to help prevent over or under processing. These variables may be controlled manually or by a controller. The controller may receive input from sensors 505, as well as input from additional sensors operable to monitor the temperature of burner unit 504 and the rotational speed of rotating drum 503.

In another exemplary embodiment, a processing apparatus and method utilizes both charring and supercritical/subcritical fluid processing to transform an input material into an output material capable of being used as a water storage material. In this setup, it is contemplated that the excess heat generated in the charring stage can be used to heat or to help heat the water used during the supercritical fluid processing stage.

Figure 6:
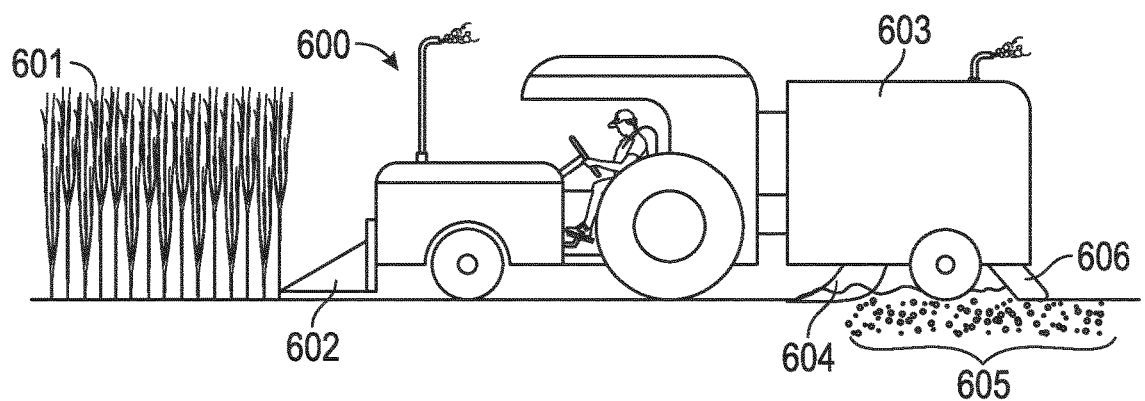
FIG. 6 is a schematic view of a vehicle capable of harvesting a crop, processing a water storage material, and burying water storage material in the ground.

Referring to FIG. 6, a processing and harvesting machine (shown as combine 600) is shown according to an exemplary embodiment. Combine 600 harvests crop 601 through crop pickup 602. Combine 600 is configured to separate a first portion of the crop, a consumer valuable portion (e.g., corn ears), from a second portion of the crop, a waste portion (e.g., corn stalks). Combine 600 routes the second portion of the crop to processor 603. Combine 600 may have a storage compartment for storage of the first portion of the crop. Processor 603 receives the second portion of the crop as input material for processing into a water storage material. Processor 603 houses a processing system that performs one of the above processing methods and is operable to turn an input biomass into water storage material 605. Water storage material 605 may be stored on board combine 600 for future placement. Alternatively, water storage material 605 may be immediately placed and/or buried by combine 600.

To facilitate immediate placement and future placement, combine 600 may include burying device 604. Burying device 604 buries water storage material 605 at a predetermined depth into the ground. Burying device 604 can distribute water storage material 605 through spraying, disbursing, laying, or any other method operable to place the material. Burying device 604 may contain a plow mechanism to shift ground before placing water storage material 605. Burying device 604 is adjustable such that water storage material 605 can be buried at varied depths to accommodate different types of crops having different root structures. Accordingly, the burying depth of water storage material 605 may be based on at least one agricultural parameter. The agricultural parameters include crop type, local climate conditions, local climate predictions, soil quality, an irrigation system (e.g., presence, type, amount of water provided), and/or soil contents. Further, burying device 604 can be adjusted to place the water storage material at varying areal densities. In some situations, it may be desirable to heavily saturate the ground in order to achieve a high density of water storage material 605. In other situations, it may be desirable to have a low density of water storage material 605, and thus the burying device 604 will distribute very little of water storage material 605. Accordingly, the areal density of water storage material 605 may be based on at least one agricultural parameter. The agricultural parameters include crop type, local climate conditions, local climate predictions, soil quality, an irrigation system (e.g., presence, type, amount of water provided), and/or soil contents.

Processor 603 further contains ground shaping mechanism 606. Ground shaping mechanism 606 shapes the ground above the depth that water storage material 605 is buried. In order for water storage material 605 to fully function, water needs to reach water storage material 605. Ground shaping mechanism 606 reshapes the ground in order to help direct surface water to water storage material 605.

Combine 600 further includes a data recorder having data storage means such as a data storage medium. The data recorder is configured to record any of the amount of water storage material 605 buried in the ground, the location of the buried or deposited water storage material 605, the depth of the buried or deposited water storage material 605, the areal density of the buried or deposited water storage material 605, and any functional characteristics of water storage material 605 (e.g., the base material of water storage material 605, any impregnated chemicals, or any other parameter associated with the production and placement of the water storage material).

Figure 7:
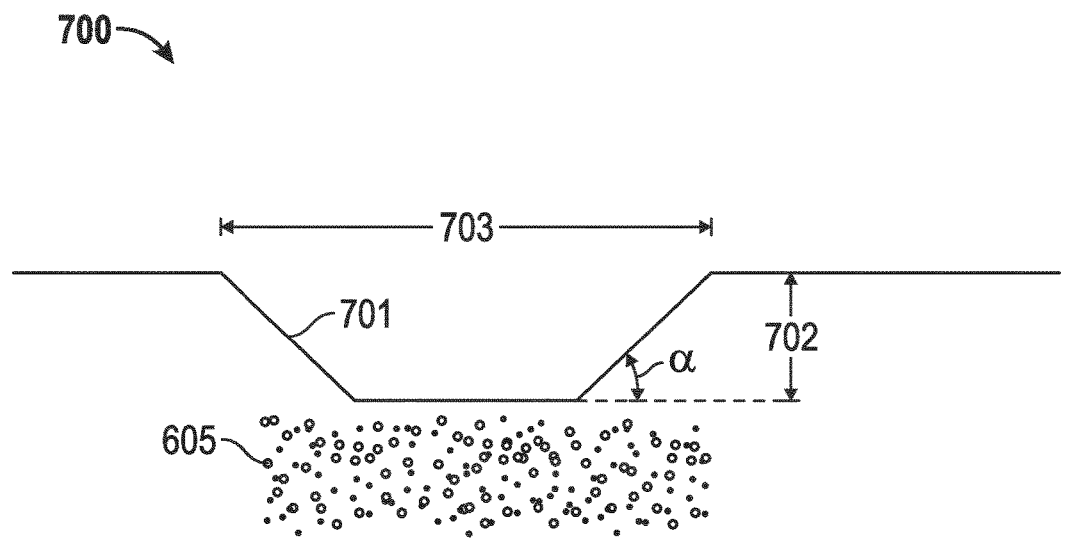
FIG. 7 is a schematic view of a water storage material placement in the ground beneath a water-guiding trench.

As shown in FIG. 7, the reshaped ground may take on the appearance of trough or channel 700 having sloped walls 701 to help guide surface water. Ground shaping mechanism 606 is adjustable to adjust the depth 702, the width 703, and the angle α of the sloped walls 701 of trough or channel 700. Depth 702 is less than the depth at which water storage material 605 is buried. Ground shaping mechanism 606 is not limited to shaping a trough or channel 700. Ground shaping mechanism 606 may be configured to reshape the ground into any shape that functions to route water to the ground above placed water storage material 605. Further, it is contemplated that ground shaping mechanism 606 may be configured to flatten the ground above water storage material 605. Such a configuration may be desirable if the ground is used for a lawn or golf course.

Figure 8:
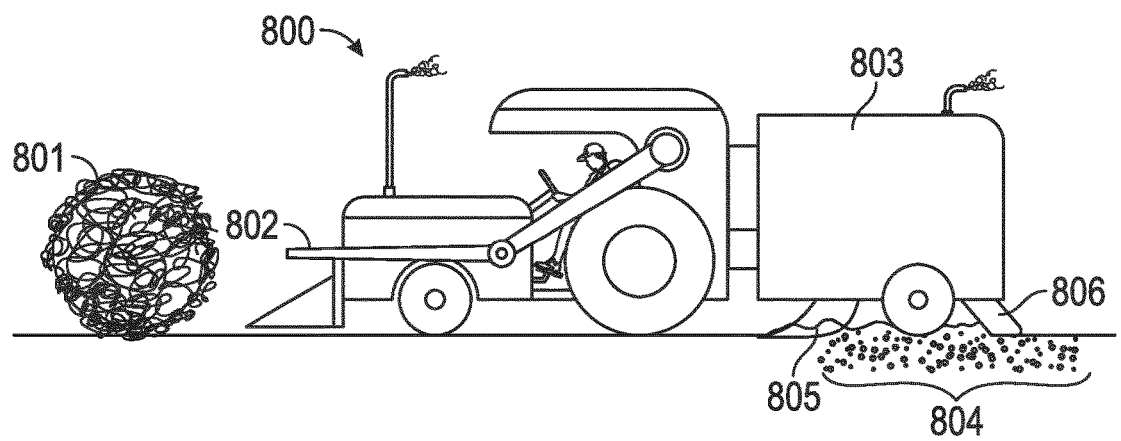
FIG. 8 is a schematic view of a vehicle capable of processing a water storage material and burying the water storage material in the ground.

Referring to FIG. 8, an additional exemplary processing machine 800 is shown. Processing machine 800 is independent of a harvesting machine, such as a combine. Processing machine 800 is operable to pick up harvesting waste plant material formed into bale 801 with mechanical arm 802. While processing machine 800 is shown to be capable of gathering waste plant material from bales, it should be appreciated that processing machine 800 may be configured to pick up other shapes of harvesting waste including, but not limited to, piles, waste located in bins, and waste left along the path of harvesting. After processing machine 800 picks up bale 801, the machine places bale 801 into receiving component 803. Once in the receiving component, bale 801 is processed into water storage material 804 using one of the above described methods.

Processing machine 800 further contains burying device 805. Burying device 805 buries the finished water storage material 804 at a predetermined depth into the ground. Burying device 805 is adjustable such that water storage material 804 can be buried at varied depths. Further, burying device 805 can be adjusted to deposit varying amounts of water storage material 804.

Processing machine 800 further includes ground shaping mechanism 806. Ground shaping mechanism 806 shapes the ground above the depth that water storage material 804 is buried. Ground shaping mechanism 806 may reshape the ground into a trough or channel to help direct surface water to water storage material 804. Ground shaping mechanism 806 is adjustable to adjust the depth, the width, and the angle of the sloped walls of the trough or channel. Further, it is contemplated that ground shaping mechanism 806 may be configured to flatten the ground above water storage material 804.

Processing machine 800 further includes a data recorder having data storage means such as data storage medium. The data recorder is configured to record any of the amount of water storage material 804 buried or deposited in the ground, the location of the buried or deposited water storage material 804, the depth of the buried or deposited water storage material 804, the areal density of the buried or deposited water storage material 804, and any functional characteristics of water storage material 804 (e.g., the base material of water storage material 804, any impregnated chemicals, or any other parameter associated with the production and placement of the water storage material).

The water storage material can be strategically placed to improve agricultural growing operations. For example, it may be desirable to place the water storage material according to a set pattern. It is contemplated that a farmer may choose to place the water storage material only along designated paths where planting will occur, such as beneath rows of corn in a cornfield or beneath the intended locations of individual plants. Such an application may minimize the amount of water storage material needed. Alternatively, the water storage material may be placed across entire areas. Such a placement strategy is optimal for applications in dry climates that receive minimal precipitation or in areas where plants cover the entire land, such as lawns and golf courses. Accordingly, placement of water storage material may be based on at least one agricultural parameter. The agricultural parameters include crop type, local climate conditions, local climate predictions, soil quality, an irrigation system (e.g., presence, type, amount of water provided), and/or soil contents. The agricultural parameters may factor into the placement depth and the areal density of the buried water storage material. As discussed below, an automated, location-assisted water storage material placement system may be employed.

Figure 9:
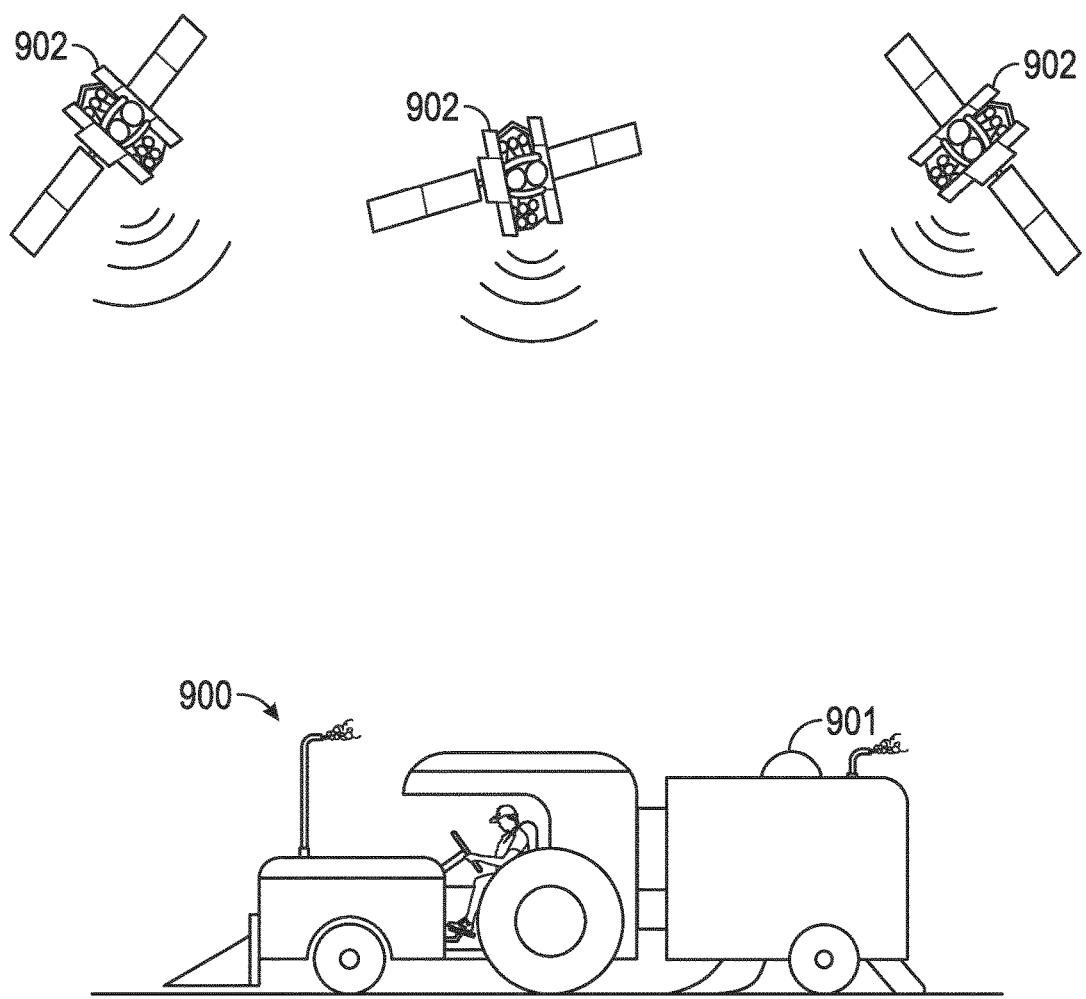
FIG. 9 is a schematic view of a water storage material placement vehicle using location-assisted placement.

Referring to FIG. 9, in order to assist with strategic water storage material placement, water storage material placement vehicle 900 may utilize location-assisted placement to precisely place the material. Placement vehicle 900 is equipped with location tracking equipment, such as GPS receiver 901 in an exemplary embodiment. GPS receiver 901 receives signals from GPS satellites 902 and precisely tracks the location the location of placement vehicle 900. Tracking data may be sent to and stored in a computer or navigation device. Tracking data may be useful for determining where and when water storage material was placed.

Figure 10:
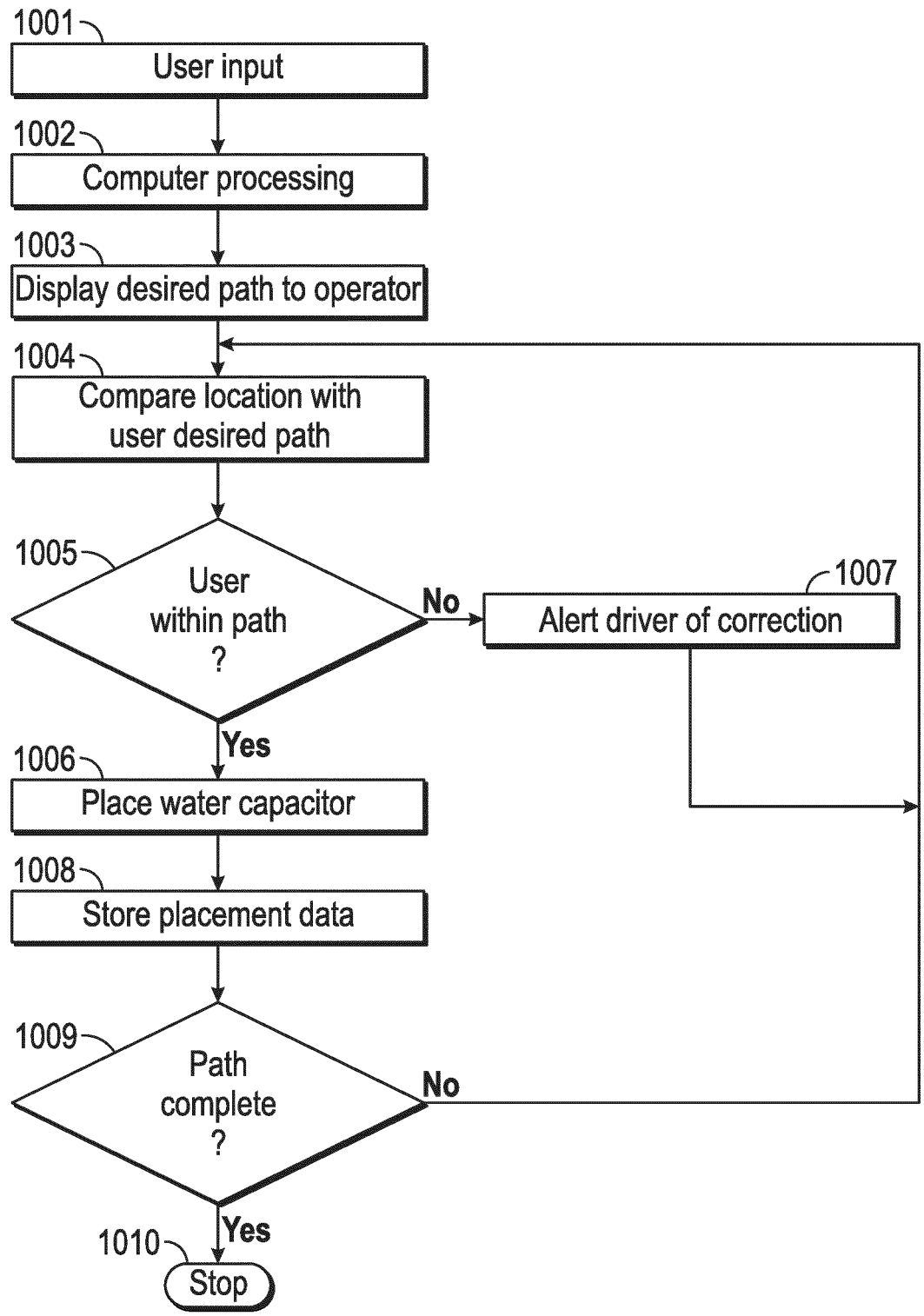
FIG. 10 is a flow diagram of a location-assisted water storage material placement method.

FIG. 10 shows a flow chart describing a basic method of utilizing location-assisted placement of water storage material. The steps of the location-assisted placement method may be facilitated and controlled by a central control unit. A user input as to the desired placement strategy is provided (step 1001). The user placement strategy corresponds to a water storage material emplacement plan or emplacement map. The user can select from a variety of preset patterns or templates including, but not limited to, rows, geometric shapes, perimeters, areas, and/or lines between two points. The template may correspond to an algorithm relating a desired trait of a placement of the water storage material to a sensed characteristic of the ground material. The sensed characteristic may be the presence or the amount of water in the ground material, the presence or the amount of previously placed water storage material, or the composition of the ground material. Alternatively, it is contemplated that the user can manually input the desired pattern through a series of coordinates or through interaction with a graphical user interface displaying a map of the land. The user may further define other variables including, but not limited to, depth and density of the desired water storage material placement or depositing. Further, it is contemplated that a user may select a template from a set of templates that automatically selects a pattern and sets water storage material variables based on any of previous water storage material application history, crop type, season, geographic location, weather predictions, and/or layout of the land. The desired placement or depositing strategy is stored by a data recorder in data storage medium.

Further referring to FIG. 10, the user input undergoes computer processing (step 1002) to define a path for the water storage material placement vehicle to follow, processing parameters for water storage material, water storage material placement information, and ground shaping instructions. The path may be optimized to lay the water storage material in the desired pattern in a minimal amount of time. It is further contemplated that the path of the water storage material placement vehicle may be optimized to minimize fuel consumption. Once a path is processed, the path is displayed to the operator of the water storage material placement vehicle on a device containing software capable of tracking the location of the water storage material placement vehicle. The path may be displayed on a portable display unit capable of being placed in the water storage material placement vehicle. In an alternative embodiment, the path may be displayed in a built-in display unit in the water storage material placement vehicle. Still, in a further embodiment, the path may be displayed on a personal electronic device, such as a mobile phone, a smartphone, a tablet computing device, a laptop, or a PDA.

After displaying the path to the operator, the operator begins operating the vehicle to place the water storage material in the ground. During operation, it is contemplated that the operator receives real-time navigation instructions through the display containing the processed path. During operation, the method contemplates that the software displaying the desired path receives the vehicle's actual location and compares the location with the desired path (step 1004). If the user is within the desired path (see step 1005), the software either alerts the operator to place the water storage material or controls the placement of the water storage material through a data link with the processing machine (step 1006). If the vehicle is not within the desired path, the system can alert the driver (step 1007) of the proper steps needed to regain alignment with the desired path. Further, if the vehicle is off path, the system can stop placement of the water storage material until the vehicle is in the right spot.

Further referring to FIG. 10, the system stores placement data (step 1008). The placement data can be analyzed by a user or operator. It is further contemplated that the user or operator may wish to keep records of the locations of water storage materials, the dates of placement, and the types of water storage material placed. Accordingly, the system includes a data recorder having data storage means such as data storage medium. The data recorder is configured to record any of the amount of water storage material buried in the ground or deposited on the ground, the location of the buried or deposited water storage material, the depth of the buried water storage material, the areal density of the buried or deposited water storage material, and any functional characteristics of water storage material (e.g., the base material of water storage material 804, any impregnated chemicals, or any other parameter associated with the production and placement of the water storage material). It is further contemplated that the system can upload the stored information to an online server for remote access or a user-owned remote storage device.

As the placement vehicle continues to place water storage material along the desired path, the system continuously tracks the vehicle's progress along the desired path and determines if the path is complete (step 1009). If the path is complete, the process stops (step 1010) and the driver of the vehicle is alerted that the placement is complete. If the path is not complete, the process returns to step 1004 and continues until the path is complete.

The water storage material may function longer than a single growing season. The rate at which the contemplated water storage material naturally degrades depends on many factors including the material the water storage material is made from, the type of soil the water storage material is buried in, and the depth at which the water storage material is buried. Further, water storage material from one placement may function in harmony with water storage material of a future placement. Accordingly, a seasonal user, such as a farmer, may wish to adjust the amount of water storage material he places in the ground every season depending on the condition and quantity of any water storage material in the ground from prior seasons. Thus, it is beneficial to enable already placed water storage material to be easily identified.

In one embodiment, the water storage material may contain an identifying taggant. The taggant operates to identify a batch of already placed water storage material. The taggant may also identify, link to, or store information pertaining to the year in which the water storage material was applied, the base material that forms the water storage material, the type of crop the water storage material was used for, any minerals, vitamins, biological materials, or pesticides impregnated in the water storage material, the quantity or density of water storage material placed, its state of biodegradation, its water capacity, or any other characteristic of the placed water storage material. The taggant may be a chemical that is capable of detection and identification by a sensor. The chemical can be impregnated in, or placed in contact with, the water storage material. Alternatively, the taggant may be an RFID tag that is buried with the water storage material. The RFID may comprise sensors to detect taggants. Accordingly, the taggant can be scanned by a sensor to determine what type of water storage material is already in the ground.

Figure 11:
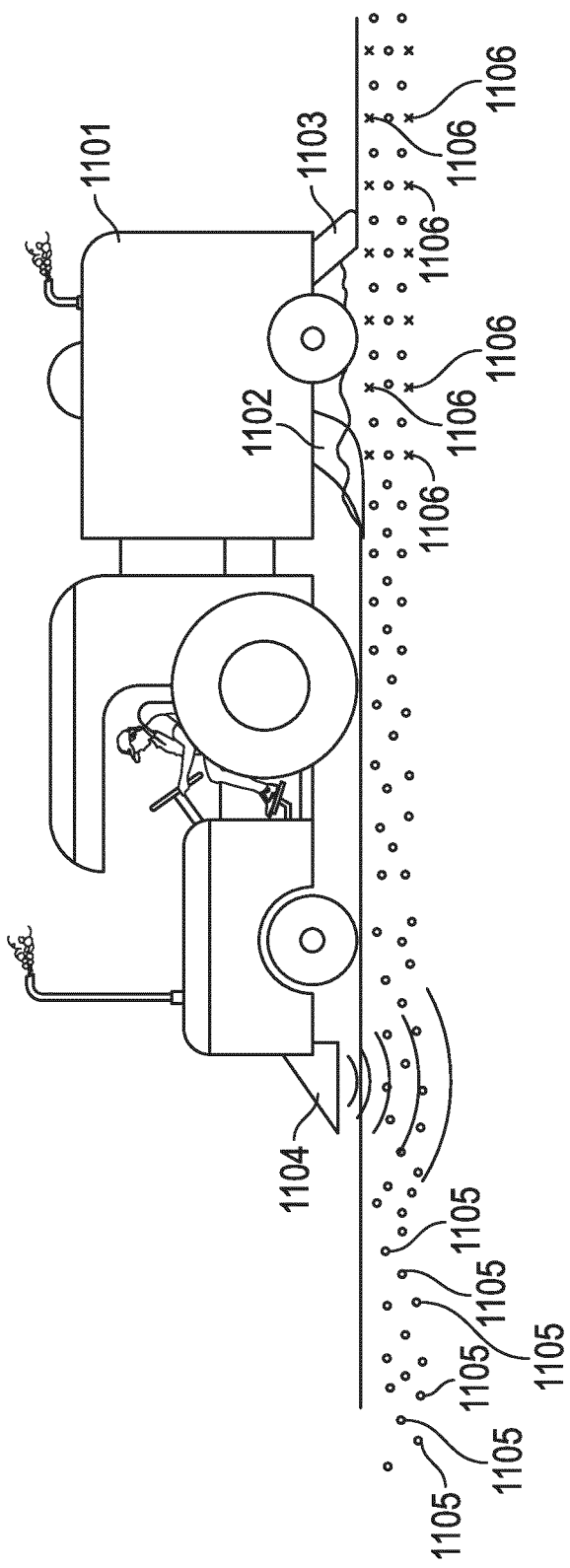
FIG. 11 is a schematic view of a water storage placement vehicle having sensing means.

Referring to FIG. 11, an exemplary water storage material processing and placement vehicle 1101 is shown. Vehicle 1101 includes water storage material burying mechanism 1102 and ground shaping mechanism 1103. Additionally, vehicle 1101 contains sensors 1104. Sensors 1104 are operable to detect conditions of the ground material. The conditions of the ground material include the presence of previously placed water storage material 1105, the location and density of previously placed water storage material, the presence of water in the ground material, the depth of any located water, the pH of located water, and the ground material composition. Accordingly, sensors 1140 may be ground penetrating radar, ultrasound, infrared, resistive, and pH sensors. Alternatively, sensors 1104 are capable of detecting chemical taggants impregnated in the already placed water storage material 1105. Alternatively, sensors 1104 are RFID readers capable of detecting RFID tags buried with the already placed water storage material 1105. Sensors 1104 output sensor signals indicative of the detected ground characteristics to a controller. The controller is configured to analyze the detected ground characteristic and is configured to adjust parameters of burying mechanism 1102 such that the amount of new water storage material 1106 placed can be adjusted to account for the amount and type of water storage material already in the ground 1105. For example, the areal density or the burial depth for new water storage material 1106 may be adjusted based on the detected presence or absence of already placed water storage material 1105.

In an alternative embodiment, the water storage material may contain colorants such that the material may be identified after placement in the ground. The colorants of the water storage material may serve to identify the year in which the water storage material was applied, the base material that forms the water storage material, the type of crop the water storage material is used for, any minerals, vitamins, biological agents, or pesticides impregnated in the water storage material, the quantity or density of water storage material placed, or any other characteristic of the placed water storage material. The colorants may be visible to the naked eye. Thus, when plowing the fields containing a water storage material having a colorant, identification of the colorant can be made without any additional machinery. Alternatively, the colorants may be sensed by a sensor. The sensor may be part of a water storage material placement machine.

For example, a farmer may annually plow and seed his farmland. During plowing, the farmer may notice the colored water storage material in the ground remaining from last year. The farmer can utilize written or electronic records to match the water storage material's color with the type of material the water storage material was made from, the date the water storage material was placed, the density of the water storage material in the soil, and if the already placed water storage material has any pesticides or nutrients impregnated in it. Based on the discovered information, the farmer may adjust the amount of water storage material he or she wishes to place in the ground for the upcoming season.

It is important to note that any of the above described embodiments can have various functions split into separate machines or vehicles. Combine 600, processing machine 800, vehicle 900, and vehicle 1101 may be separated into multiple vehicles each with a distinct function. For example, it is contemplated that a first vehicle processes an input material into a water storage material, but does not bury it. The first vehicle then places or deposits the processed water storage material onto the surface of the ground. The processed water storage material may be bound and/or packaged, deposited in bulk deposits, placed according to a desired emplacement pattern, or arbitrarily placed as it is processed. A second vehicle then buries the placed water storage material. The second vehicle may place the water storage material in the pattern it was laid out by the first vehicle. Alternatively, the second vehicle can pick up and bury the placed water capacitor material in a different location.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. An apparatus for detecting a condition of a ground material and placing a water storage material in the ground material, the water storage material capable of absorbing a liquid and releasing the liquid, comprising:
   a vehicle including a sensor and a burying mechanism;
   wherein the sensor is configured to detect the condition of the ground material and to provide a sensor signal; and
   wherein the burying mechanism is configured to bury the water storage material at a burying depth below a surface of the ground material in response to the sensor signal.

2. The apparatus of claim 1, wherein the condition of the ground material comprises a presence or absence of a previously placed water storage material.

3. The apparatus of claim 1, wherein the condition of the ground material comprises a presence or absence of water within the ground material.

4. The apparatus of claim 1, wherein the burying mechanism is adjustable such that the burying depth is adjustable.

5. The apparatus of claim 1, wherein the burying mechanism is adjustable such that the water storage material can be buried at different densities.

6. The apparatus of claim 1, wherein the sensor is an RFID reader.

7. The apparatus of claim 1, further including a controller, the controller is configured to receive the sensor signal from the sensor and is further configured to send a burying signal to the burying mechanism, the burying signal includes a depth parameter and a density parameter corresponding to the burying depth and a burying density of the water storage material.

8. An apparatus, comprising:
   a vehicle including a sensor and a burying mechanism; and
   a controller operatively coupled to the sensor and to the burying mechanism;
   wherein the sensor is configured to detect a condition of a ground material and to provide a sensor signal to the controller; and
   wherein the burying mechanism is configured to bury a water storage material at a burying depth below a surface of the ground material based on a burying signal received from the controller.

9. The apparatus of claim 8, wherein the burying signal includes a depth parameter and a density parameter corresponding to the burying depth and a burying density of the water storage material.

10. The apparatus of claim 8, wherein the condition of the ground material comprises a presence or absence of a previously placed water storage material.

11. The apparatus of claim 8, wherein the condition of the ground material comprises a presence or absence of water within the ground material.

* * * * *